United States Patent [19]

Curley et al.

[11] Patent Number: 5,309,037
[45] Date of Patent: May 3, 1994

[54] POWER-ON RESET CIRCUIT WITH ARBITRARY OUTPUT PREVENTION

[75] Inventors: Lawrence D. Curley, Endwell; Matthew J. Mitchell, Jr., Endicott, both of N.Y.

[73] Assignee: International Business Machines Corporation, Armonk, N.Y.

[21] Appl. No.: 910,194

[22] Filed: Jul. 8, 1992

[51] Int. Cl.$^5$ ............................................. G06F 11/00
[52] U.S. Cl. .......................... 307/272.3; 307/296.4; 377/114
[58] Field of Search ................ 307/242, 243, 272.3, 307/272.1, 291, 296.1, 296.4, 296.6, 355; 340/146.2

[56] References Cited

U.S. PATENT DOCUMENTS

| | | | |
|---|---|---|---|
| 4,551,841 | 11/1985 | Fujita et al. | 371/66 |
| 4,608,669 | 8/1986 | Klara et al. | 365/194 |
| 4,983,857 | 1/1991 | Steele | 307/272.3 |
| 4,989,175 | 1/1991 | Boris et al. | 364/900 |
| 5,039,875 | 8/1991 | Chang | 307/272.3 |

OTHER PUBLICATIONS

IBM TDB, vol. 34, No. 3, Aug. 1991, B. K. Bullis et al., pp. 448-451, "Asynchronous Reset Control of LSSD Parts".

*Primary Examiner*—Timothy P. Callahan
*Assistant Examiner*—Shawn Riley
*Attorney, Agent, or Firm*—Arthur J. Samodovitz

[57] ABSTRACT

A power-on reset circuit is used to initialize a system component upon power-on. The circuit comprises a digital circuit such as a shift register which exhibits a multiplicity of uncertain or random outputs upon power-on. These output are coupled to digital logic such as an AND gate which itself outputs a power-on reset signal when any of the outputs of the shift register is not a predetermined output level. Because the outputs of the shift register are uncertain or arbitrary upon power-on and there are a multiplicity of such outputs, it is not likely that all of the outputs of the shift register will coincidentally exhibit the predetermined levels upon power-on. Consequently, it is very likely that the AND gate will provide the power-on reset signal upon power-on to initialize the system component. Subsequently, when the system is ready for normal operation, the shift register is set with the predetermined levels to terminate the power-on reset signal and thereby enable or condition the system component for normal operation.

18 Claims, 3 Drawing Sheets

POWER-ON RESET CIRCUIT WITH ARBITRARY OUTPUT PREVENTION

BACKGROUND OF THE INVENTION

The invention relates to power-on reset circuits which establish initial conditions for circuitry immediately after power is turned on.

"Power-on" can occur when the circuitry is installed in a system and a system power switch is subsequently activated or when the circuitry resides on a card which is initially disconnected from the system and then installed in the system after the power switch has been activated. For many types and arrangements of integrated circuits, it is important that the circuitry assume a predetermined "safe" state immediately after power-on and until the circuit begins normal operation. For example, tristate CMOS drivers cannot tolerate large heat dissipation, and this can cause a problem in a computer system where the CMOS drivers face each other in a bidirectional communication line. Overheating could occur if one CMOS driver exhibited a high output state whereby it outputted a high level of drive current and the other CMOS driver simultaneously exhibited a low output state whereby it sunk the high level of drive current supplied by the one CMOS driver. Thus, during the period between power-on and beginning of normal operation, it is important that either both drivers be disabled into the tristate (a high impedance output state), or if enabled that the foregoing condition be avoided. There are many other circuit types and arrangements where the circuit states should be controlled during this period.

In the prior art it was known to sense the power supply voltage during power-on, and when the voltage reached the rated voltage or a predetermined voltage near the rated voltage, then generate a reset pulse to initialize the circuitry to a safe state. Also, some prior art power-on reset circuits included delays to the reset pulse to ensure that all circuitry has attained a stable operating state after the rated voltage or predetermined voltage is reached.

While such voltage sensing power-on reset circuits are effective in many types of circuits, they require analog type circuitry which cannot readily be integrated with some types of digital circuitry used to implement the normal function.

Accordingly, a general object of the present invention is to provide a power-on reset circuit which utilizes digital circuitry.

SUMMARY OF THE INVENTION

The invention resides in a power-on reset circuit used to initialize a system component upon power-on. The circuit comprises a digital circuit such as a shift register which exhibits a multiplicity of uncertain or random outputs upon power-on. These output are coupled to digital logic such as an AND gate which itself outputs a power-on reset signal when any of the outputs of the shift register is not a predetermined output level. Because the outputs of the shift register are uncertain or arbitrary upon power-on and there are a multiplicity of such outputs, it is not likely that all of the outputs of the shift register will coincidentally exhibit the predetermined levels upon power-on. Consequently, it is very likely that the AND gate will provide the power-on reset signal upon power-on to initialize the system component. Subsequently, when the system is ready for normal operation, the shift register is set with the predetermined levels to terminate the power-on reset signal and thereby enable or condition the system component for normal operation.

According to one feature of the present invention, inverters are inserted between some (preferably half) but not all of the outputs of the shift register and the inputs to the AND gate if the outputs of the shift register are not entirely random. This arrangement preserves the statistical likelihood that all of the outputs of the shift register will not coincidentally exhibit the predetermined output upon power-on.

DETAILED DESCRIPTION OF THE PREFERRED EMBODIMENTS

Figure 1:
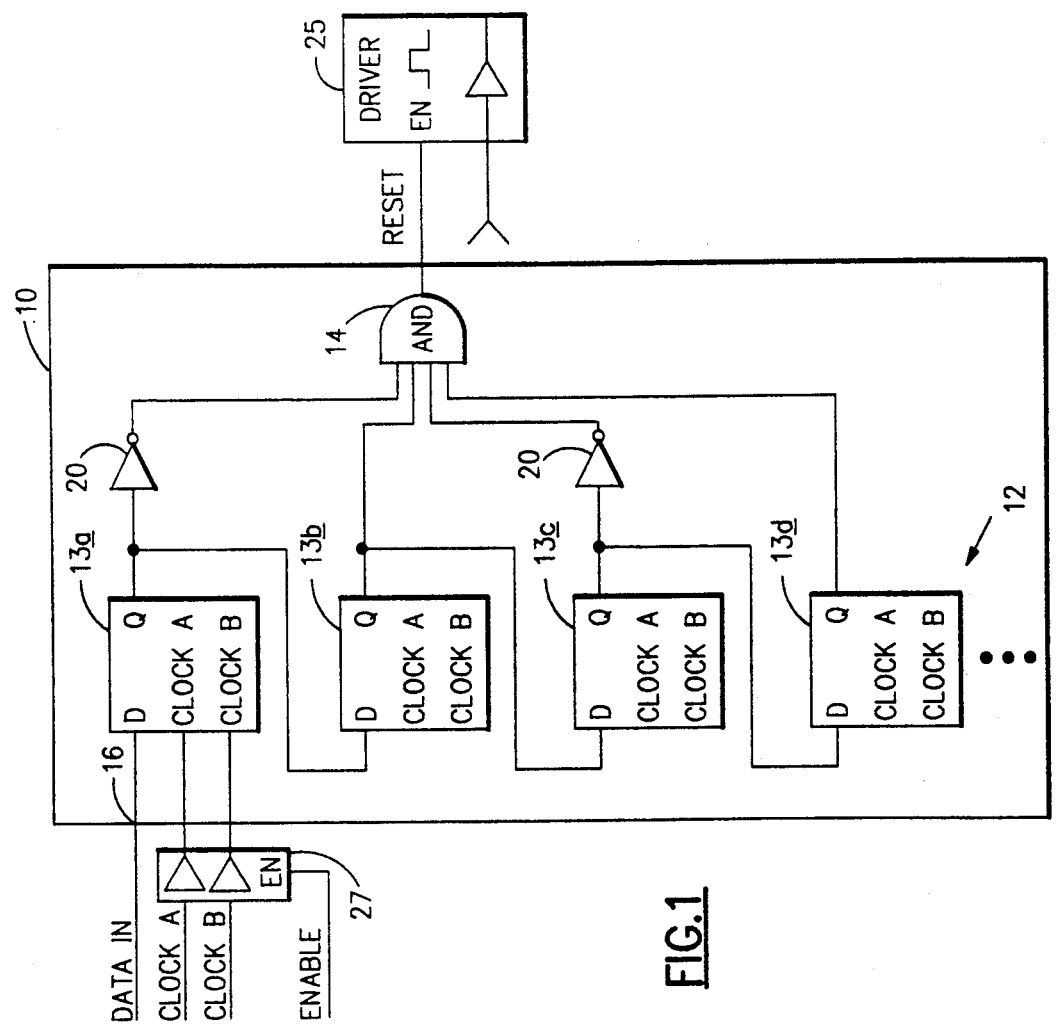
FIG. 1 is a diagram of a power-on reset circuit embodying the present invention.

Referring now to the figures in detail wherein like reference numerals indicate like elements throughout the several views, FIG. 1 illustrates a circuit generally designated 10 which embodies the present invention. The circuit 10 is used to power-on reset a system which includes a tristate driver 25. Circuit 10 comprises a serial shift register 12 having a multiplicity of data storage cells 13a,b,c,d,etc., an AND gate 14, a data input port 16 to the serial shift register to receive a predetermined bit sequence when the system is ready for normal operation, and clocks A and B to propagate the bit sequence through the serial shift register. By way of example, there are thirty two cells 13a,b,c,d,etc. in the shift register 12. The object of the circuit 10 is to yield a low power-on reset signal at the output of the AND gate immediately after the system is powered on and maintain the low power-on reset signal until the system begins normal operation. The circuit 10 operates as follows:

When the system is initially powered on, each of the cells 13a,b,c,d,etc. settles at an arbitrary state such that the output of each cell is arbitrary. Until the system begins normal operation, a driver 27 is disabled so neither clock A nor clock B is supplied to the serial register 12 and the data input 16 to the serial register does not propagate through the serial register. The outputs of the cells are supplied to different inputs of an AND gate 14. The output of the AND gate 14 is connected to an Enable input of driver 25 (and many other circuits which require disabling or initialization to avoid an unsafe condition). The driver 25 is enabled by a high level. In the aforesaid example where there are thirty two cells in shift register 12, there are thirty two inputs to AND gate 14. Thus, the chances are only one in two to the thirty second power, that all of the outputs of the shift register will coincidentally satisfy the conditions for the AND gate 14 upon power-on. Therefore, there is a very high likelihood that the output of AND gate 14, the reset pulse, will be low upon power-on and disable the driver 25 and other circuitry. This low power-on reset pulse will persist until the aforesaid bit sequence is loaded into the shift register 12.

When the system is ready for normal operation, the system feeds the serial bit sequence into the shift register via data input port 16 and enables the driver 27 to pass the clocks A and B to the shift register. When the serial bit sequence completes its propagation into the shift register as described below, the outputs of the shift register will satisfy all the input conditions of the AND gate. Then, the low power-on reset pulse is replaced by a high pulse which enables the driver 25 and the other circuitry now shown. At this time also, the driver 27 is disabled to prevent the clocks A and B from further propagating the bit sequence through the serial register.

If the cells of the shift register are such that they indeed settle at a random output upon power-on, then the shift register outputs can be supplied directly to the inputs of the AND gate 14. In such a case, the chances are only one in two to the thirty second power that the AND gate will be satisfied upon power-on as noted above. In this case also, the bit sequence will be a series of thirty two ones. However, for some technologies used to construct the shift register cells, there may not be a purely random output of each cell upon power-on. Instead, the cells may more likely exhibit one state or the other upon power-on. Therefore, in the preferred embodiment of the present invention as illustrated in FIG. 1, inverters 20,20 are included between every other output of the shift register and the corresponding input of the AND gate. Thus, if the shift register cells have a propensity to settle in one state or the other upon power-on, the chances are still very small that all the conditions of the AND gate 14 will be satisfied upon power-on The inverters 20,20 can be provided either externally to the shift register as shown or from a Q NOT output of cells 13a,c. The bit sequence for the circuit 10 illustrated in FIG. 1 is an alternating sequence of ones and zeros, the zeros for the flip flops 13a,c.

Figure 2A:
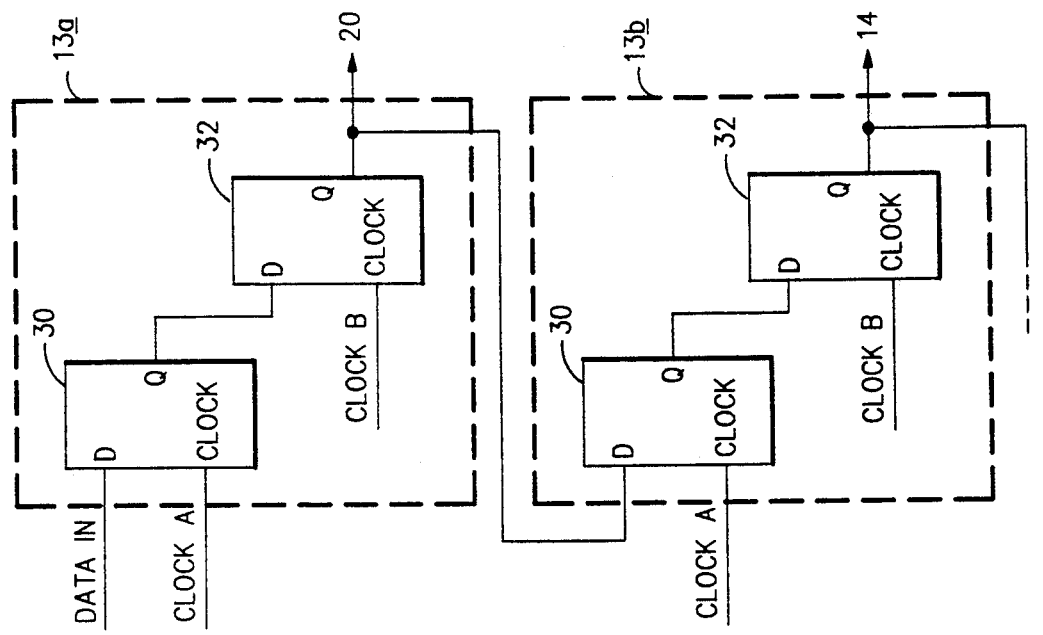
FIG. 2 is a more detailed circuit diagram of two cells of a statistical register within the power-on reset circuit of FIG. 1.
Figure 2B:
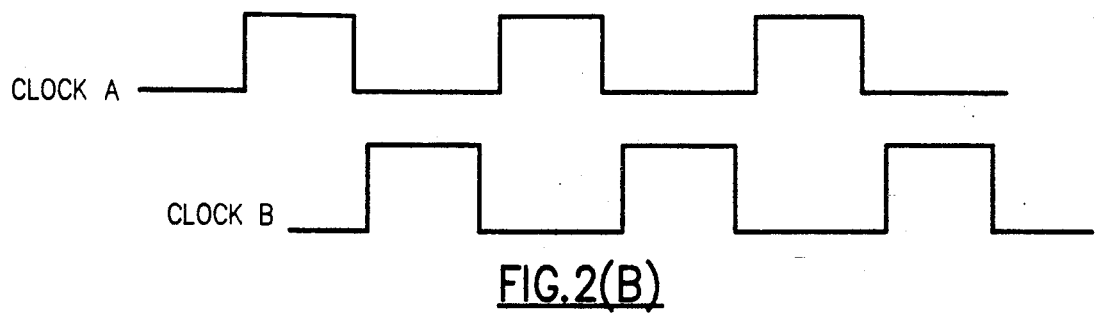

FIG. 2(a) illustrates two of the cells 13a,b in more detail. Each of the cells comprises two identical flip flops 30 and 32. Each of the flip flops passes a D input to a Q output when a high level is applied to a clock input. This state persists, i.e. is latched, until the high level is replaced by a low level and a subsequent high level is applied to the same clock input. While the low level is applied to the clock input, the Q output remains the same regardless of the level of the D input. Clock A supplies the clock input for each flip flop 30, and clock B supplies the clock input for each flip flop 32. FIG. 2(b) illustrates the timing patterns of clock A and clock B. Each of the clocks has a shorter high period than low period, and the two clocks are phase shifted relative to each other such that the two clocks never exhibit their respective high states at the same time. This ensures reliable propagation of the bit patterns suppled by the system via data input 16 through all cells 13a,b,c,d,etc. in the shift register as follows. For each pulse of the clock A, the D input of flip flop 30 of cell 13a is latched in and passed to the Q output of the flip flop 30. Upon the next pulse of the clock B, the Q output of flip flop 30 is latched in and passed to the Q output of flip flop 32 of cell 13a. Upon the next pulse of Clock A, the Q output of flip flop 32 of cell 13a is latched in and passed to the Q output of the flip flop 30 of cell 13b. Upon the next pulse of Clock B, the Q output of flip flop 30 of cell 13b is latched in and passed to the Q output of flip flop 32 of cell 13b. Thus, the bit sequence supplied by the system propagates through the cells, and after thirty two pulses of clock A and the intermingled thirty two pulses of clock B, the bit sequence will appear in sequence at the output of shift register 12. This bit sequence will satisfy the And gate 14 to terminate the low power-on reset pulse, and thereby enable tristate driver 25 and other circuitry now shown. Then, the driver 27 is disabled to block clocks A and B so the bit pattern does not propagate further through the shift register 12. When enabled, the driver 25 passes the normal operating signals.

If the system ever needs to disable the driver 25 again, the system can supply a different bit sequence that does not satisfy the AND gate 14 and enable the driver 27 to pass the clocks A and B to load the bit sequence into the shift register 12.

Figure 3:
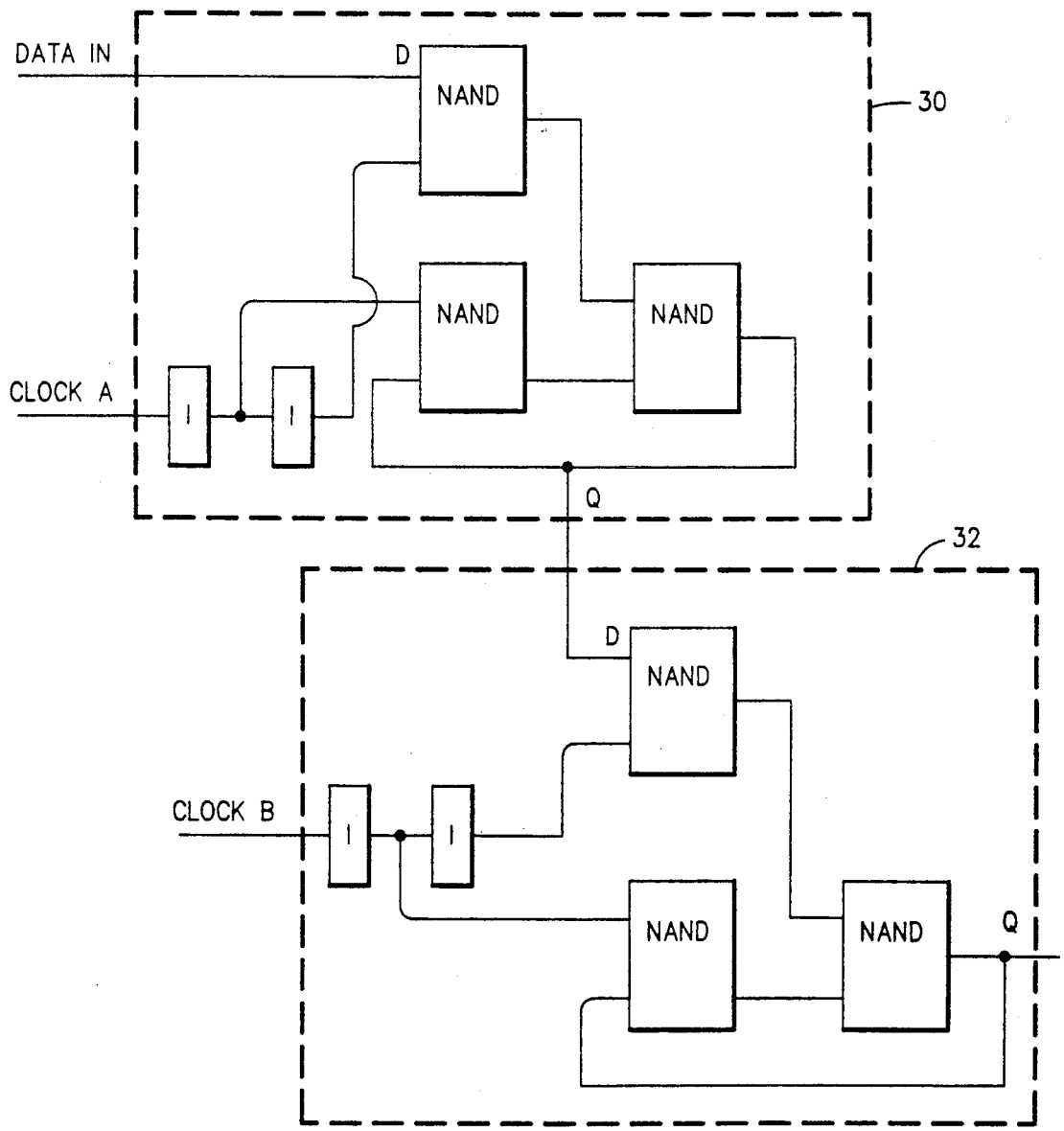
FIG. 3 is an even more detailed circuit diagram of one cell of the statistical register of FIG. 2.

FIG. 3 illustrates one previously known embodiment of latches 30 and 32 in great detail. The latches comprise NAND gates and Inverters, and support a serial (or parallel) arrangement of cells 13a,b,c,d,etc.

Figure 4:
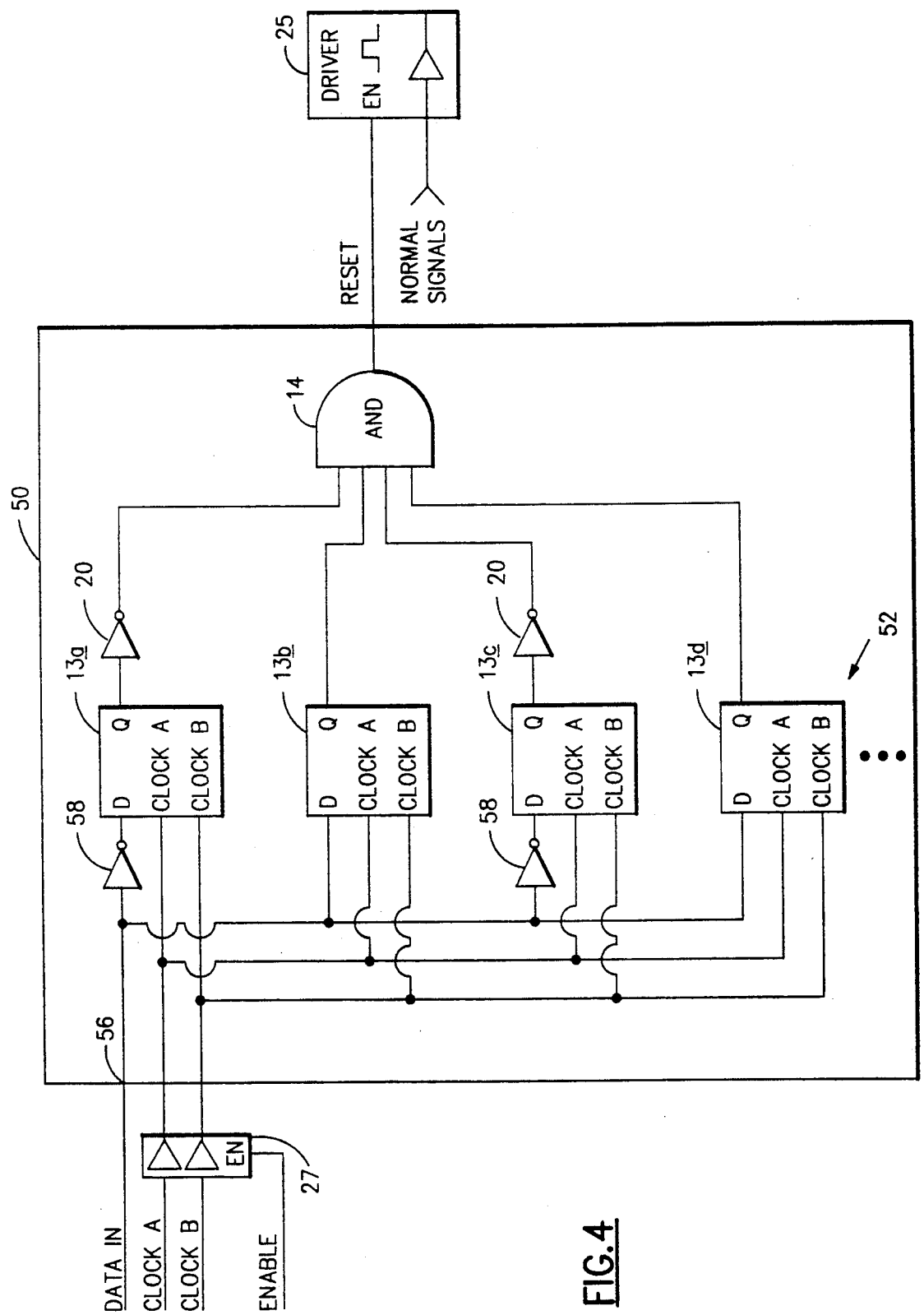
FIG. 4 is a diagram of an alternate embodiment of the power-on reset circuit of the present invention.

FIG. 4 illustrates an alternate circuit 50 embodying the present invention. In this embodiment, the cells 13a,b,c,d,etc. of shift register 52 are arranged in parallel instead of in series as in the shift register 12 of FIG. 1. Whereas in the shift register 12 the output of each cell (except the last) is supplied as the input to the next cell and the bit sequence is successively propagated through the cells, in the shift register 52, the input to each cell is independently supplied and simultaneously latched into the cells when the system is ready for normal operation. The circuit 50 operates as follows:

Immediately after power-on, each of the thirty two cells 13a,b,c,d,etc. outputs a random logic level. The probability is very high that the random outputs of shift register 52 will not then satisfy the AND gate 14, and the output of AND gate 14 will supply the low power-on reset pulse to the driver 25 to avoid an unsafe condition. Clocks A and B are blocked by driver 27 until the system is ready for normal operation. When the system is ready for normal operation, the system supplies a logic one level through a data input port 56 and enables driver 27 to pass the clocks A and B to shift register 50. The logic one level is inverted by inverters 58,58 to a logic level zero for the D input to every other cell 13a,c,etc. but is supplied directly as a logic level one for the D input to the other cells 13b,d, etc. Upon the first positive going pulse of clock A, the D inputs are latched in and passed to the Q output of the flip flop 30 of each cell 13a,b,c,d,etc. and upon the next positive going pulse of clock B, the contents of each flip flop 30 is latched in and passed to the Q output of the flip flop 32 of the same cell. Consequently, after the two pulses, the D inputs supplied by the data input port 56 appear at the output of the respective cells and satisfy the AND gate 14. Thus, the driver 25 will now be enabled for normal operation. Then, the system disables the driver 27 to block the clocks A and B and thereby "freeze" the state of the shift register 52 so that the driver 25 remains enabled indefinitely. When enabled, the driver 25 passes the normal operating signals.

If the system subsequently needs to disable the driver 25 again, the system supplies a logic zero to the data input port 56 and enables the driver 27 to pass the clocks A and B.

Based on the foregoing. a power-on reset circuit embodying the present invention has been disclosed. However, numerous modifications and substitutions can be made without deviating from the scope of the present invention. For example, a different number of cells 13 can be used. Also, digital devices other than a shift register, such as a latch or data storage device can be used to yield the random output upon power-on to supply as inputs to AND gate 14. Therefore, the invention has been disclosed by way of illustration and not limitation, and reference should be made to the following claims to determine the scope of the present invention.

We claim:

1. A circuit for generating a power-on reset signal to initialize a system component upon power-on, said circuit comprising:
   digital circuit means for exhibiting a multiplicity of uncertain output levels upon power-on and exhibiting a multiplicity of predetermined output levels when subsequently set;
   power-on reset means, coupled to receive the multiplicity of outputs of said digital circuit means for generating a first digital output when all of the outputs of said digital circuit means exhibit said predetermined levels and generating a second digital output when any of the outputs of said digital circuit means does not exhibit its predetermined level;
   means for using the second digital output of said power-on reset means as a power-on reset signal to initialize said system component upon power-on; and
   means for setting said digital circuit means subsequent to power-on to exhibit said predetermined output levels and thereby cause said power-on reset means to generate said first digital output and enable or condition said system component for normal operation; and wherein
   the digital circuit means inverts some but not all of its outputs prior to input to said power-on reset means.

2. A circuit as set forth in claim 1 wherein said digital circuit means exhibits arbitrary outputs upon power-on.

3. A circuit as set forth in claim 1 wherein said digital circuit means comprises a multiplicity of registers, latches or flip-flops.

4. A circuit as set forth in claim 1 wherein said digital circuit means comprises a serial shift register; and further comprising means for serial loading and shifting a bit sequence into said serial shift register to provide said predetermined levels to said power-on reset means at the beginning of normal operation of said system component.

5. A circuit as set forth in claim 1 wherein said digital circuit means comprises a parallel shift register; and further comprising means for setting said shift register in parallel with said predetermined levels at the beginning of normal operation of said system component.

6. A circuit as set forth in claim 1 further comprising:
   clock means for initiating the setting of said digital circuit means at the beginning of normal operation of said system component;
   means for disabling or blocking said clock means between the power-on time and the beginning of normal operation of said system component; and
   means for enabling or passing said clock means at the beginning of normal operation of said system component to initiate setting of said digital circuit means.

7. A circuit as set forth in claim 1 further comprising a computer processor for controlling normal operation of said system component.

8. A circuit for generating a power-on reset signal to initialize a system component to a safe state between a power-on time and a beginning of normal operation of said system component, said circuit comprising:
   a multiplicity of digital cells, each of said cells exhibiting an uncertain output when powered-on and before being set to a certain state;
   an AND gate having a multiplicity of inputs coupled to receive the multiplicity of outputs of said cells, respectively, either directly or through an inverter for each of one or more of said outputs;
   means for using an output of said AND gate as a power-on reset signal to render said system component into a predetermined safe state between the power-on time and the beginning of normal operation of said system component; and
   means for setting said digital cells at the beginning of normal operation of said system component to states that satisfy said AND gate to thereby terminate said power-on reset signal and render said system component operable.

9. A circuit as set forth in claim 8 wherein each of said digital cells maintains said uncertain output until being set to said certain state.

10. A circuit as set forth in claim 8 wherein each of said digital cells comprises a register, latch or flip-flop.

11. A circuit as set forth in claim 8 wherein said digital cells are arranged as a serial shift register; and further comprising means for serial loading and shifting a bit sequence into said serial shift register to satisfy said AND gate at the beginning of normal operation of said system component.

12. A circuit as set forth in claim 8 wherein said digital cells are arranged as a parallel shift register; and further comprising means for setting said shift register cells in parallel at the beginning of normal operation of said system component with a bit pattern that satisfies said AND gate.

13. A circuit as set forth in claim 8 wherein some of said outputs of said digital cells are inverted prior to application to respective inputs of said AND gate and other of said outputs of said digital cells are not inverted prior to application to respective inputs of said AND gate.

14. A circuit as set forth in claim 8 further comprising: clock means for initiating the setting of said digital cells at the beginning of normal operation of said system component;
   means for disabling or blocking said clock means between the power-on time and the beginning of normal operation of said system component; and
   means for enabling or passing said clock means at the beginning of normal operation of said system component to initiate setting of said digital cells.

15. A circuit as set forth in claim 8 further comprising a computer processor for controlling normal operation of said system component.

16. A circuit for generating a power-on reset signal to initialize a system component to a predetermined state between a power-on time and a beginning of normal operation of said system component, said circuit comprising:
   a multiplicity of digital cells, each of said cells exhibiting an uncertain output when powered-on;
   a plurality of inverters connected to respective outputs of some but not all of said cells;
   an AND gate having a multiplicity of inputs coupled to receive respective outputs of the cells which are not connected to said inverters and respective outputs of said inverters;

means for using an output of said AND gate as the power-on reset signal to render said system component into the predetermined state between the power-on line and the beginning of normal operation of said system component; and means for setting said digital cells at the beginning of normal operation of said system component to state that satisfy said AND gate to thereby terminate said power-on reset signal and render said system component operable.

17. A circuit as set forth in claim 16 wherein each of said digital cells maintains said uncertain output until being set to said certain state.

18. A circuit as set forth in claim 16 wherein each of said digital cells comprises a register, latch or flip-flop.

* * * * *